J. G. JONES.
Spading-Machines.
No. 145,737. Patented Dec. 23, 1873.
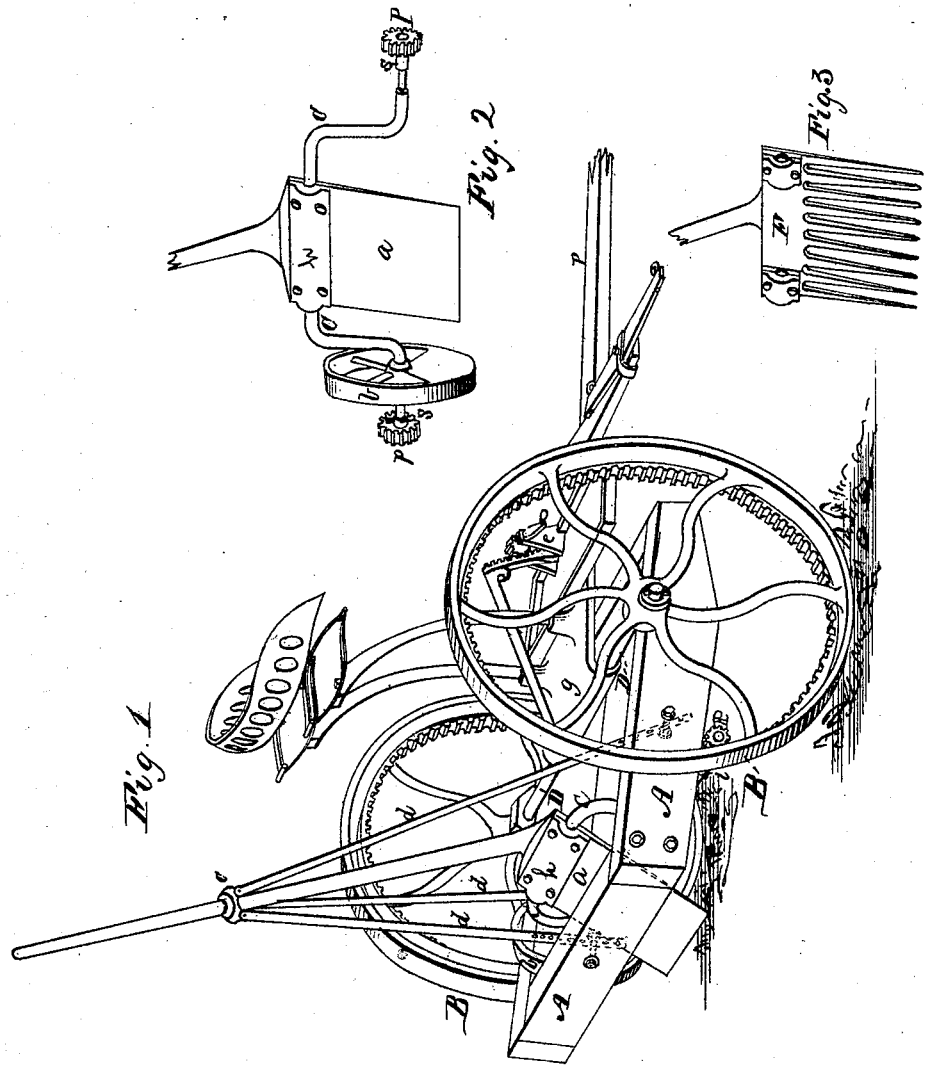
Witnesses
Oliver Ames 2d
Geo. W. Kennedy
Inventor
John Gilmore Jones

UNITED STATES PATENT OFFICE.

JOHN G. JONES, OF FALMOUTH, MASSACHUSETTS.

IMPROVEMENT IN SPADING-MACHINES.

Specification forming part of Letters Patent No. 145,737, dated December 23, 1873; application filed April 7, 1873.

*To all whom it may concern:*

Be it known that I, JOHN GILMORE JONES, of Falmouth, in the county of Barnstable and State of Massachusetts, have invented a Spading-Machine, of which the following is a specification:

My invention relates to the application of animal power to a spade or spades, or fork, in such a manner as to turn and pulverize the surface of the soil more thoroughly than is done by plowing. This object is attained by the combination of spade or spades, or fork, crank, balance, pinion, and driving wheels with their adjustments.

Figure I is a perspective view of the machine. Fig. II represents the spade, crank, balance, and pinion wheels. Fig. III represents the fork.

A is a substantial frame, bolted firmly to the under side of the axle D, and upon which frame hangs the crank C secured by bearings $i$ $i$. The spade $a$ is confined to the crank C by hinge-fastening $h$, while its handle can play freely through the thimble $c$, held in place by the braces $d$ $d$ $d$, made movable and adjustable at their lower ends, to regulate the inclination of the spade-cut. The spade $a$ is put in operation by the pinion-wheels $p$ $p$ being acted upon by the teeth of the driving-wheels B B, when the machine is drawn forward by the application of the draft power. The motion of the spade $a$ and crank C conforms in direction to the motion of the driving-wheels B B, and hence the earth is turned and thrown backward. The axle D and pole P are connected together by the hinge-coupling $g$. The depth of the cut of the spade $a$ is graded by rack-and-pinion adjustment $e$ upon the pole P at the front end of the frame A, while the length of cut is dependent upon the extent of sweep of the crank C. The cuts in the above arrangement will reach or lap into each other two or three inches, and hence all the surface of the soil will be thoroughly turned. The crank C is kept in gear by the spring-head linch-pins $s$ $s$ holding against catches on the inside of the pinion-wheels $p$ $p$ while the machine is advancing; but these pins $s$ $s$ allow of backward motion of the machine without revolving the crank C.

I claim as my invention—

1. In a spading-machine, the combination of the vertically-arranged spade $a$, pivoted to the crank C, having balance-wheel $b$, and operated by the pinion-wheels $p$ $p$ gearing in the driving or traction wheels B B, with the braces $d$ and thimble $c$, all arranged and operating as hereinbefore set forth.

2. The combination of catches upon the inside of the pinion-wheels $p$ $p$, and of the spring-head linch-pins $s$ $s$, by the insertion or removal of which the machine is put into or out of gear, as hereinbefore set forth.

JOHN GILMORE JONES.

Witnesses:
HARRIET P. JONES,
NETTIE P. JONES.